(12) United States Patent
Berchin et al.

(10) Patent No.: US 10,277,277 B2
(45) Date of Patent: Apr. 30, 2019

(54) ULF/VLF POWER LINE COMMUNICATIONS COUPLER

(71) Applicant: ACLARA TECHNOLOGIES LLC, St. Louis, MO (US)

(72) Inventors: Gregory Berchin, St. Louis, MO (US); David Yaney, St. Louis, MO (US)

(73) Assignee: Aclara Technologies LLC, St. Louis, MO (US)

( * ) Notice: Subject to any disclaimer, the term of this patent is extended or adjusted under 35 U.S.C. 154(b) by 0 days.

(21) Appl. No.: 16/117,079

(22) Filed: Aug. 30, 2018

(65) Prior Publication Data

US 2019/0068244 A1 Feb. 28, 2019

Related U.S. Application Data

(60) Provisional application No. 62/552,629, filed on Aug. 31, 2017.

(51) Int. Cl.
*H04B 3/56* (2006.01)
(52) U.S. Cl.
CPC ....... *H04B 3/56* (2013.01); *H04B 2203/5404* (2013.01); *H04B 2203/5483* (2013.01)
(58) Field of Classification Search
CPC .... H04B 3/54; H04B 3/56; H04B 2203/5483; H04B 2203/5416; H03F 2200/541; H04H 20/84; H04L 12/2801; H04L 12/2803; H04L 12/2838; H04L 2012/2843
See application file for complete search history.

(56) References Cited

U.S. PATENT DOCUMENTS 8,310,081 B2 * 11/2012 Yelland ................... H04B 3/56
307/1

* cited by examiner

*Primary Examiner* — Rahel Guarino
(74) *Attorney, Agent, or Firm* — Sandberg Phoenix & von Gontard P.C.

(57) ABSTRACT

A circuit (100) for coupling an amplifier (1) in an electrical power distribution system with the amplifier electrically and physically isolated from a power line of the system. The amplifier generates arbitrary signal waveforms injected into the power line. A transformer (T1) has a primary and a secondary side with the amplifier located on the primary side and the secondary side connected to the power line. A resistor (R1) series connected with the primary side of the transformer is sized to accommodate a minimum load impedance of the amplifier and minimize power dissipation. A resonant circuit interposed between the secondary side of the transformer and the power line has values for a capacitor (C1) and an inductor (L3) forming the resonant circuit chosen to peak the amplitude of the arbitrary signal waveform at the frequency of a waveform propagated through the power line.

15 Claims, 12 Drawing Sheets

R1=0Ω

R1=1Ω

R1=2Ω

R1=4Ω

R1=8Ω

ULF/VLF POWER LINE COMMUNICATIONS COUPLER

This application derives and claims priority from U.S. provisional application 62/552,629 filed Aug. 31, 2017 which is incorporated herein by reference.

BACKGROUND OF THE INVENTION

Power line communications (PLC) relates to the transmission of messages and data between a utility site and a customer site using the same lines over which electricity is conducted through the utility's power grid from the one point to the other. Communications are routed in both directions over the grid and can include instructions for configuring equipment (loads) at a site, data with respect to energy availability or usage, or reports as to the current status of operations at a site.

Typically, PLC occurs at frequencies of between 3 kHz and 500 kHz, or between 1.8 MHz and 250 MHz. In PLC systems, repeaters are often employed to extend the range of communications.

By contrast, Ultra Low Frequency (ULF) and Very Low Frequency (VLF) PLC occur at frequencies between approximately 500 Hz and approximately 10 kHz. In such applications, a voltage-controlled-voltage-source (VCVS) amplifier can be used as a source for ULF/VLF signals which are injected into and routed through power lines. An output of the VCVS amplifier is connected to a low voltage or LV power line which, in the United States, carries under 1000 v; i.e., typically 120 v. or 240 v.

The present invention is directed to a ULF/VLF coupler for use in such applications so to effectively isolate the VCVS amplifier from the 50/60 Hz waveform propagated through the grid while the ULF/VLF signals the amplifier supplies to the power line are minimally impeded. In addition, the power line impedance in the ULF/VLF bands is so low that it presents an extremely difficult load for VCVS amplifiers. The present invention addresses this problem such that the ULF/VLF coupler transforms power line impedance to a higher value which allows the amplifier to operate in a safe and stable region while effecting a reasonable power transfer from the amplifier to a power line.

Prior art couplers have typically been implemented using capacitive coupling or switched load transmitters. With regard to capacitive coupling, it has been found that for ULF and VLF band signals, the capacitor required may be too large to fit within a residential electric meter. With regard to switched load transmitters, it has been found they are limited as to the possible signals they can be used to transmit. For example, arbitrary waveform generation is not possible with these transmitters.

Finally, while coupling transformers are currently available, they are designed for operation only in narrowband and broadband PLC ranges not in the ULF/VLF ranges. Examples of such couplers are described in U.S. Pat. Nos. 6,407,987; 6,104,707; 5,717,685, and 5,559,377; as well as International Application Publication WO 2012/085059.

BRIEF SUMMARY OF THE INVENTION

The present invention is directed to a ULF/VLF coupler for use in ULF/VLF PLC systems. Importantly, the coupler is used to electrically and physically isolate an amplifier from a power line of an electrical utility.

The coupler eliminates the need for large coupling capacitors, allows arbitrary waveforms to be injected into a power line, isolates the power amplifier with which the coupler is associated from 50/60 Hz power line signals, provides a relatively high load impedance, and allows use of common off-the-shelf (COTS) VCVS amplifiers such as audio amplifiers for use in creating PLC signals.

The coupler circuit utilizes a parallel resonant circuit for isolation of the amplifier. In one embodiment, the resonant circuit is on the secondary side of a transformer used in the coupler circuit; while in a second embodiment, the coupler is on the primary side of the transformer. In a third embodiment, the coupler circuit is implemented in a differential form for use in split phase applications.

The coupler of the present invention can further be used with a voltage-controlled-current-source, a current-controlled-current-source, or a current-controlled-voltage-source amplifier.

Other objects and features will be in part apparent and in part pointed out hereinafter.

BRIEF DESCRIPTION OF THE SEVERAL VIEWS OF THE DRAWINGS

The accompanying figures, together with detailed description which follows, form part of the specification and illustrate the various embodiments described in the specification.

Corresponding reference characters indicate corresponding parts throughout the several views of the drawings.

DETAILED DESCRIPTION OF THE INVENTION

Figure 1:
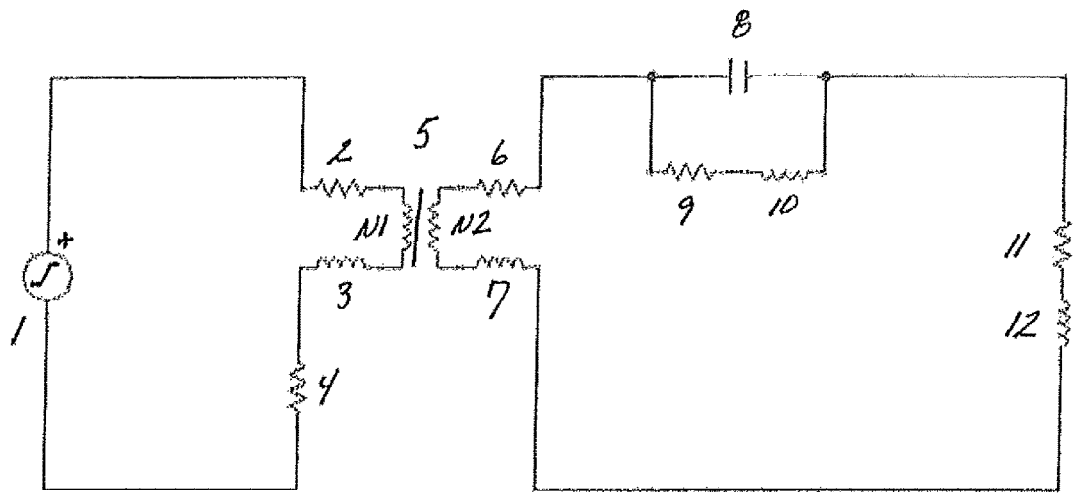
FIG. 1 is a schematic representation of an audio amplifier.

The following detailed description illustrates the invention by way of example and not by way of limitation. This description clearly enables one skilled in the art to make and use the invention, and describes several embodiments, adaptations, variations, alternatives and uses of the invention, including what is presently believed to be the best mode of carrying out the invention. Additionally, it is to be understood that the invention is not limited in its application to the details of construction and the arrangement of components set forth in the following description or illustrated in the drawings. The invention is capable of other embodiments and of being practiced or carried out in various ways. Also, it will be understood that the phraseology and terminology used herein is for the purpose of description and should not be regarded as limiting.

In the present invention, a coupler 100 is implemented in an electrical circuit including a COTS VCVS amplifier (e.g., an audio amplifier), a resistor having a sufficient power dissipation capability; a transformer capable of handling requisite primary and secondary currents; a capacitor capable of handling a sufficient level of voltage and current; an inductor also capable of handling a sufficient level of voltage and current; an access point at which the coupler is attached to a low voltage (LV) power line; and, appropriate wiring and connectors. In the electrical circuit of coupler 100, the resistance of the resistor, the turns ratio of the transformer, the capacitance of the capacitor, and the inductance of the inductor are all design parameters. In its simplest form, the electrical circuit implementing coupler 100 is for connection to a single power line wiring phase.

Referring to FIG. 1, an electrical circuit for coupler 100 first includes a COTS VCVS amplifier 1 which is connected to the primary side N1 of a transformer 5 through a power resistor 4. A resistor 2 and an inductor 3 represent the resistance and inductance of the primary windings of transformer 5, and these elements have a significant effect on circuit performance. A resistor 6 and an inductor 7 represent the resistance and inductance of the secondary windings of transformer 5, and these elements also have a significant effect on the circuit's performance.

Transformer 5 is connected to a power line through a parallel resonant circuit comprising a resistor 9 connected in series with an inductor 10, the resistor-inductor combination being in parallel with a capacitor 8. Resistor 9 represents the resistance of the windings of inductor 10, and the resistance value again has a significant effect upon circuit performance. A resistance 11 and an inductance 12 represent the power line resistance and inductance, respectively. It will be understood by those skilled in the art that power lines rarely exhibit capacitive impedance.

Transformer 5 is always incorporated in the circuit of coupler 100, even if the transformer's turns ratio is only 1:1. That is because the transformer provides complete electrical and physical isolation of power amplifier 1 and its associated circuitry from the power line and this is necessary for human safety.

Values for capacitor 8 and inductor 10 are chosen, using techniques known in the art, so as to resonate at approximately the frequency of the power line; i.e., typically 60 or 50 Hz, depending upon geographic location. The resonant frequency fr of a parallel resonant circuit, based on the values represented by the elements 8, 9, and 10 in the circuit of FIG. 1 is $fr=1/(2\pi\sqrt{(LC)})$, where L is inductance in Henrys and C is capacitance in Farads. Since fr is related to the product of L and C, there is a large number of combinations of L and C that will result in resonance at the frequency fr. The effect of different LC combinations is discussed hereinafter. Resistor 9 is parasitic, and this affects the quality factor (Q) of the resonance. So, for practical purposes, the value of the resistance of resistor 9 is generally made as low as possible.

The effect of the parallel resonant circuit comprising elements 8, 9, 10 is that the impedance of the coupler, as seen by the power line at points 11, 12, peaks at a very high value at the power line's operating frequency. This high impedance, in turn, means that very little power is transferred from the power line to the coupler. Therefore, amplifier 1 is effectively isolated from the power line at the power line's operating frequency. Further, the parallel resonant circuit provides a relatively low impedance path for ULF/VLF PLC signals transferred from the amplifier to the power line.

Figure 2:
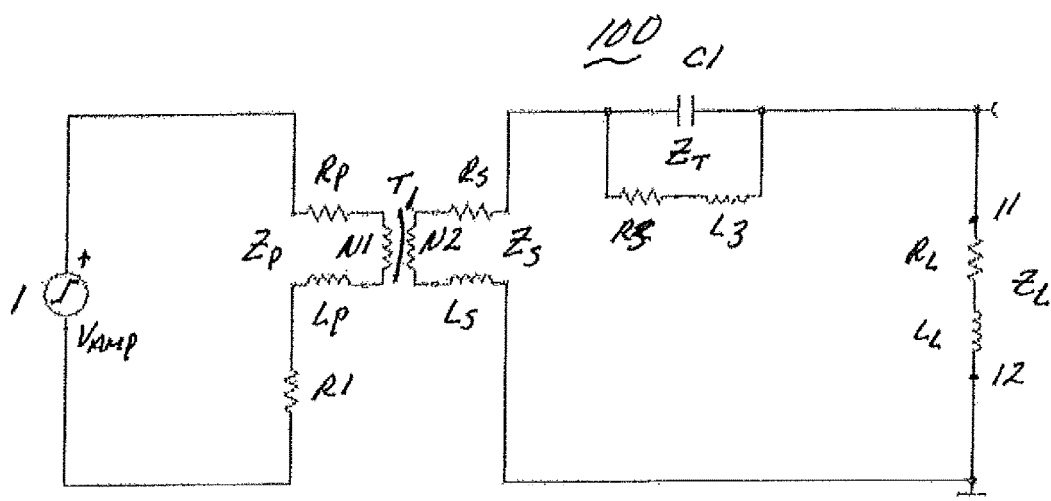
FIG. 2 is a schematic representation similar to FIG. 1 of an audio amplifier.

Referring to FIG. 2, a preferred embodiment of coupler 100 of the present invention is shown. For analysis of power transfer from amplifier 1 to the power line at across connection points 11, 12, component values for the various elements are:

RP=14 mΩ
LP=0.5 mH
N2/N1=1/1
R1=2Ω
RS=14 mΩ
LS=0.5 mH
C1=500 μf
L3=14.1 mH
R3=67 mΩ

The values for RL and LL vary considerably both by location and by circumstance. For purposes of this analysis these elements are assigned reasonably "typical" values of 55 mΩ and 120 μH, respectively.

Using standard circuit analysis techniques known in the art, a line voltage VL is computed as follows. First, the total circuit impedance ZLOAD, as seen by amplifier 1 is, $ZLOAD=ZP+[(N2/N1)2*(ZS+ZT+ZL)]+R1$ where
j is an imaginary operator,
$(\omega)=2\pi f$, where f is frequency in Hertz, $ZP=RP+j\omega LP,$ N2 is the number of turns in the secondary winding of transformer T1,
N1 is the number of turns in the primary winding of T1, $ZS=RS+j\omega LS,$ $ZT=(ZC1*ZL3)/(ZC1+ZL3),$ $ZC1=1/j\omega C1,$ and $ZL3=R3+j\omega L3.$ From the above, the current IP in the primary windings N1 of transformer T1 is computed as:

$IP=VAMP/ZLOAD,$ and the current IS in the secondary windings of transformer T1 is computed as:

$IS=IP/(N2/N1),$ and the line voltage VLINE is computed as:

$VLINE=IS*ZL$ where $ZL=RL+j\omega RL.$

It will be understood by those skilled in the art that complex arithmetic is used is solving all of the above equations.

Figure 3:
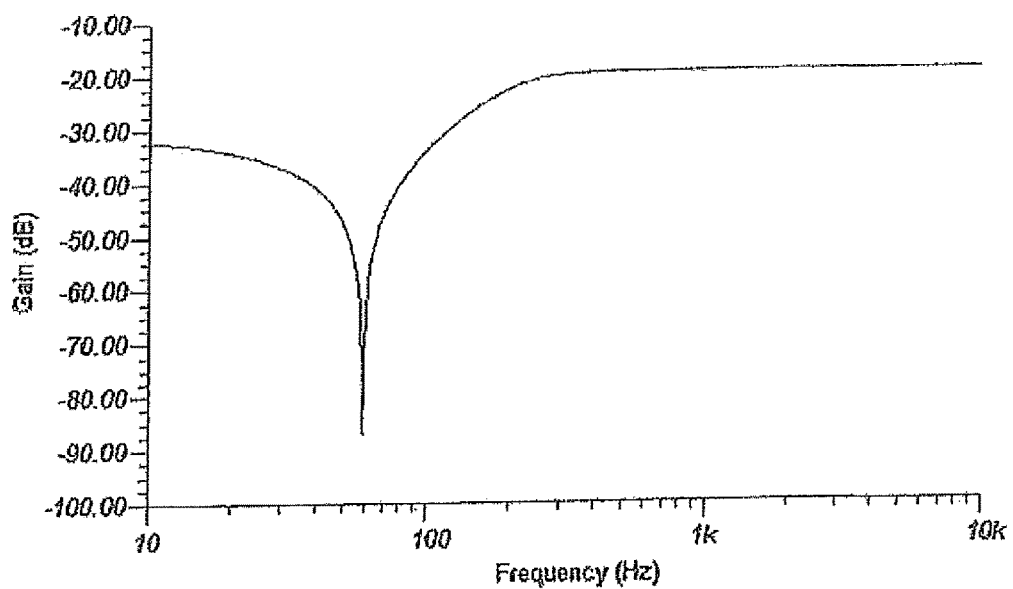
FIG. 3 is a graph of the frequency response of the circuit of the preferred embodiment.
Figure 4:
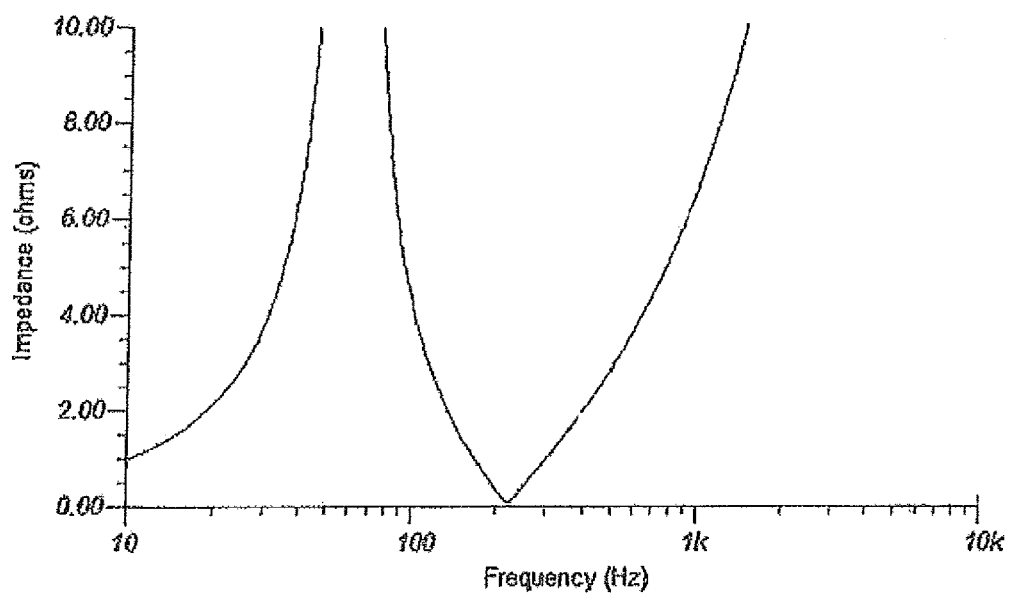
FIGS. 4-8 are graphs of the effect of changing the value of resistor R1 in the preferred embodiment.
Figure 5:
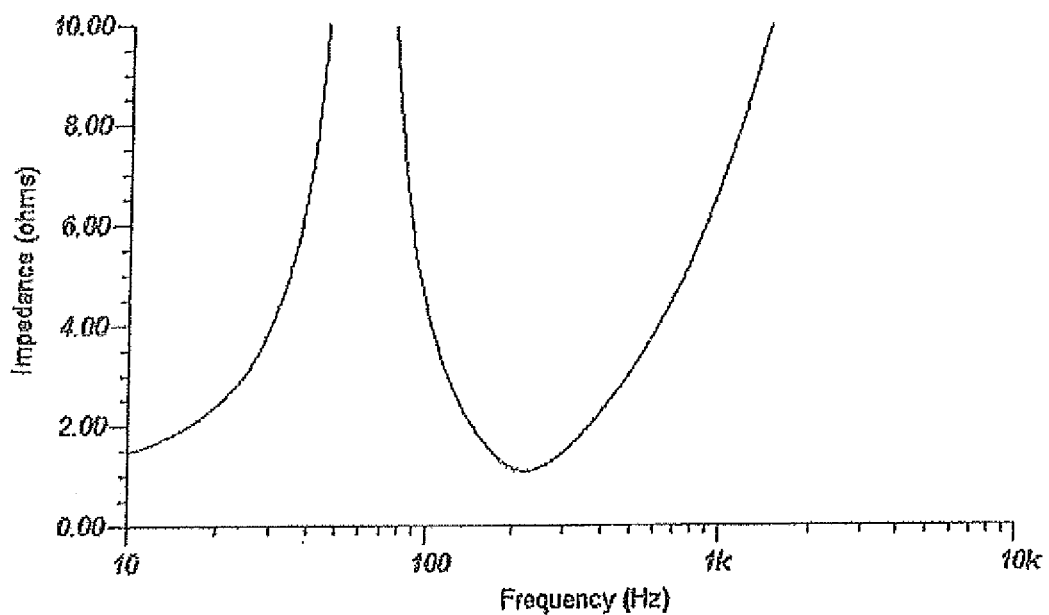
Figure 6:
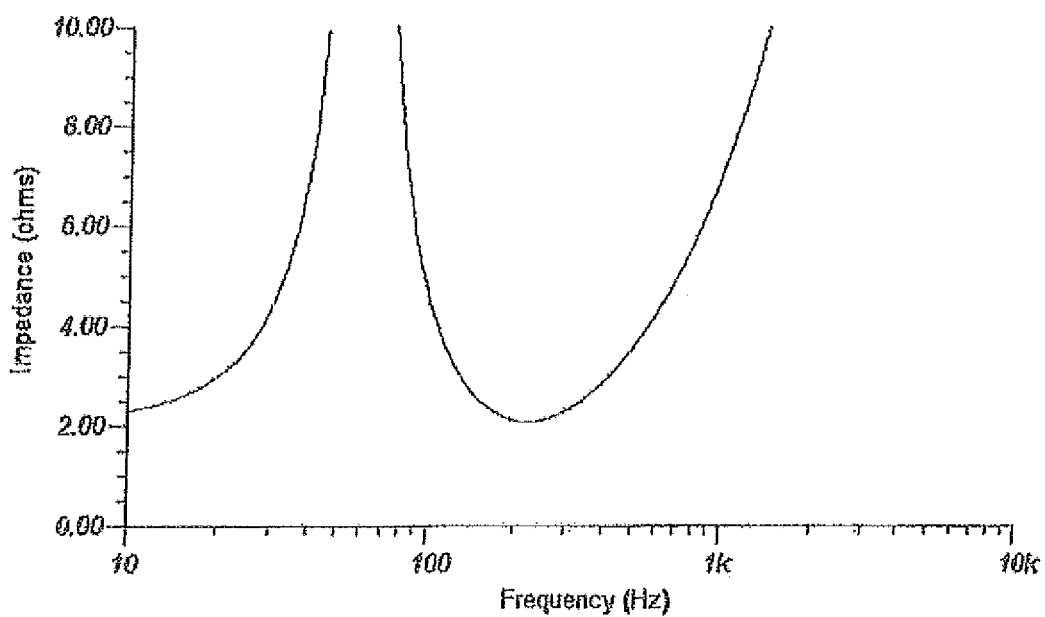
Figure 7:
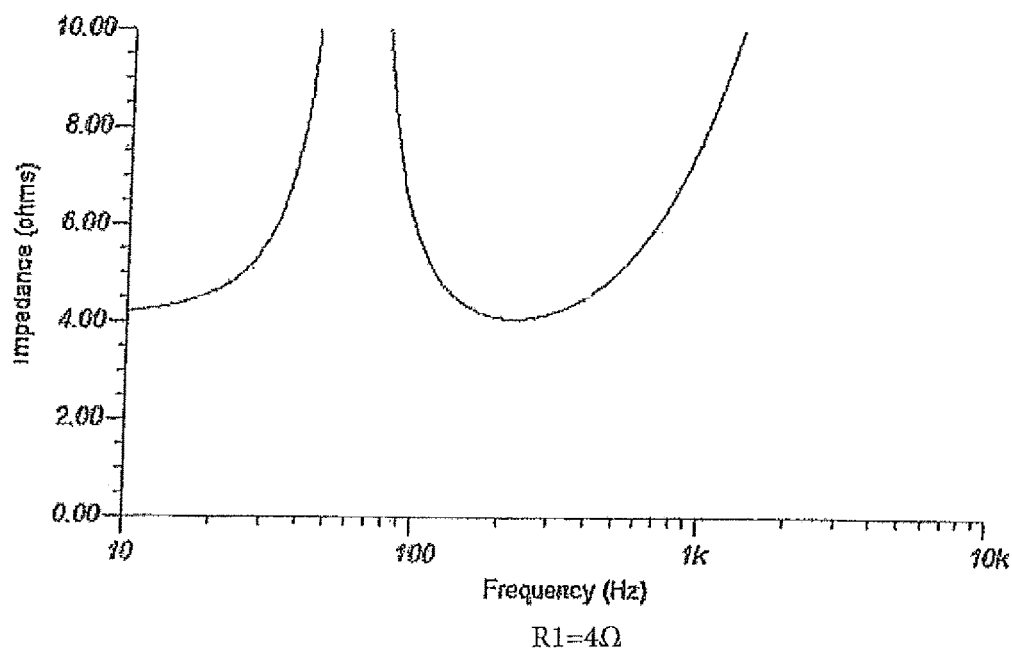
Figure 8:
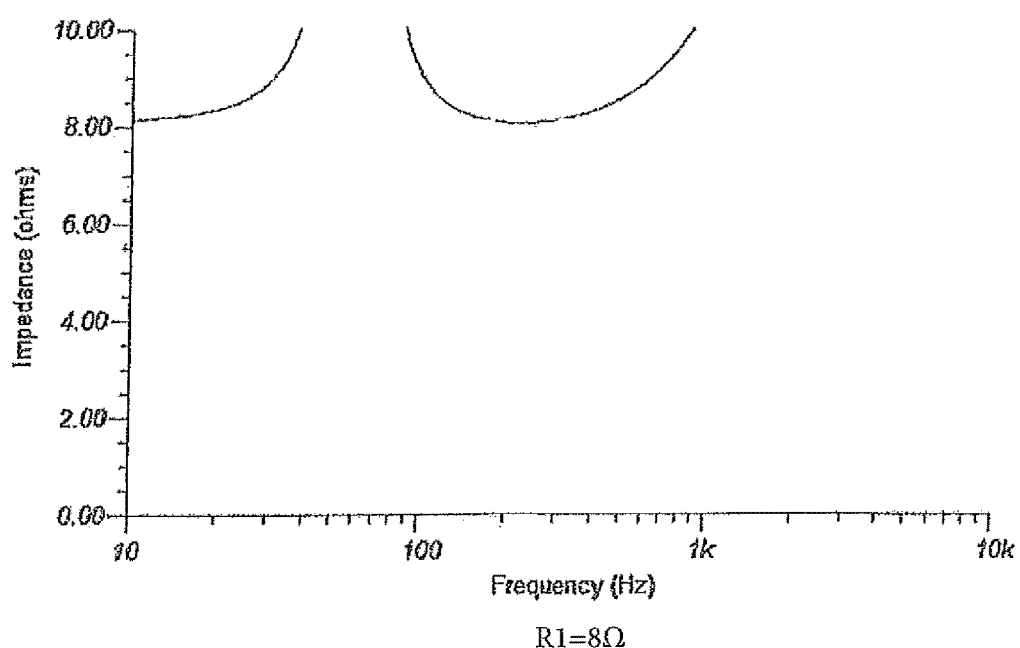

Simulating the circuit, using component values from the preferred embodiment as the basis for analysis, the frequency response of voltage transfer function VLINE//Namp is shown in FIG. 3.

The extreme reduction in gain at the frequency of 60 Hz is an important consequence of the parallel resonant circuit comprised of capacitor C1 and inductor L3, and further demonstrates the ability of the present invention to isolate the amplifier from the power line at the power line frequency.

The effects of variations in component values of the elements used in the preferred embodiment are described as follows:

Referring to FIGS. 4-8, the value of resistor R1 is shown to have a profound effect on the minimum magnitude of ZLOAD, the load impedance seen by amplifier 1. Accordingly, selection of the value of R1 is an important design consideration for the present invention. The magnitude of ZLOAD as a function of frequency (Hz), using several values of R1 in the preferred embodiment circuit configuration described above, is shown below in FIG. 4, where the value of R1 is 0Ω; in FIG. 5, where the value is 1Ω; in FIG. 6, where the value is 2Ω; in FIG. 7, where the value is 4Ω; and, in FIG. 8, where the value is 8Ω.

Thus the minimum load impedance seen by the amplifier 1, when connected to the coupler of the present invention, consists almost entirely of the value of resistor R1. The value of resistor R1 therefore is selected according to the requirements of the amplifier, e.g., if the amplifier cannot tolerate load impedances below 20Ω; then, any value of R1 greater than 20Ω will ensure that the minimum load impedance seen by the amplifier will exceed 20Ω. However, there are consequences to making R1 overly large. Again using standard circuit analysis techniques known in the art, as stated earlier:

$$VLINE=IS*ZL$$

and $$IS=IP/(N2/N1)$$

Accordingly, $$VLINE=[IP/(N2/N1)]*ZL$$

and $$IP=VLINE*(N2/N1)/ZL.$$

For a particular embodiment of coupler 100 circuit, transformer turn ratios N2 and N1 are constants, and ZL is not a controllable parameter. Thus, for a given ZL, IP is directly proportional to VLINE, and VLINE is typically a specified performance value. Since IP is also the current through R1, the power dissipated in R1 is $PR1=(IP)^2*R1$. So, for a specified value of VLINE, power dissipated in R1 is directly proportional to the resistance of R1, and is substantially wasted as heat. Therefore, it is advantageous to make R1 as small as possible.

In summary, the value of resistor R1 is chosen large enough to satisfy the minimum load impedance requirements of amplifier 1; but, otherwise kept as small as possible so that power dissipated in R1 is minimized.

Figure 9:
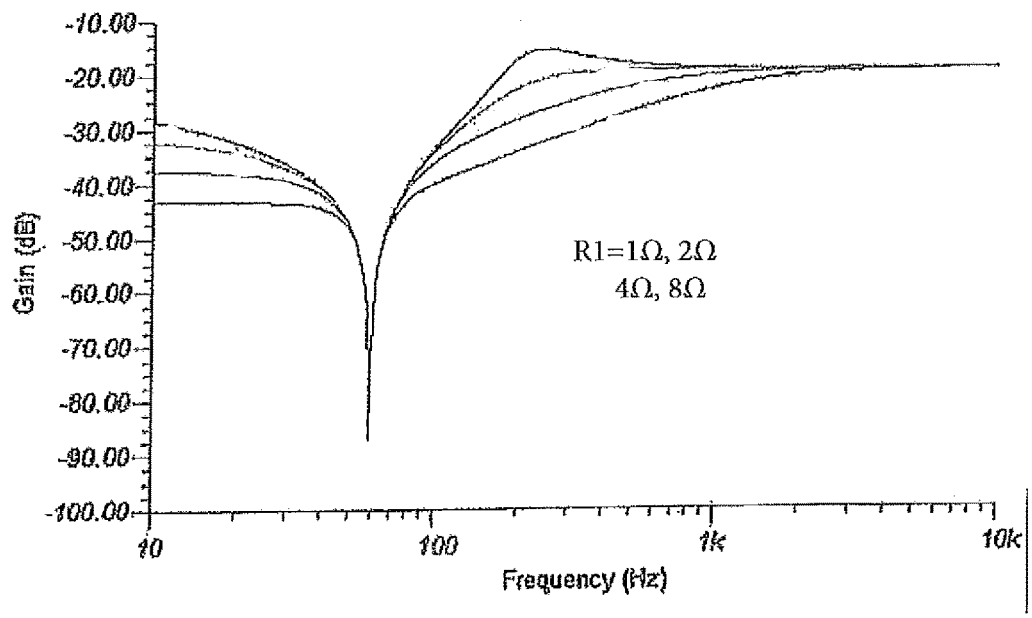
FIGS. 9 and 10 are respective graphs of gain vs. frequency for changing values of R1 (FIG. 9) and the turns ratio of the transformer (FIG. 10) in the preferred embodiment.

The value of resistor R1 also has an effect upon the voltage frequency response of the circuit. This frequency response, using several values of R1 in the preferred embodiment configuration, is shown in FIG. 9. From the highest to the lowest values between 200 Hz and 300 Hz, the curves represent R1 values of 1Ω, 2Ω, 4Ω, and 8Ω, respectively.

As shown in FIG. 9, higher values of R1 reduce the amplitude Q and, in particular, the amplitude of the peak in the frequency response. In some instances, this must be taken into account in the selection of the value of R1, along with its effect upon the minimum amplifier load impedance and power dissipation.

Figure 10:
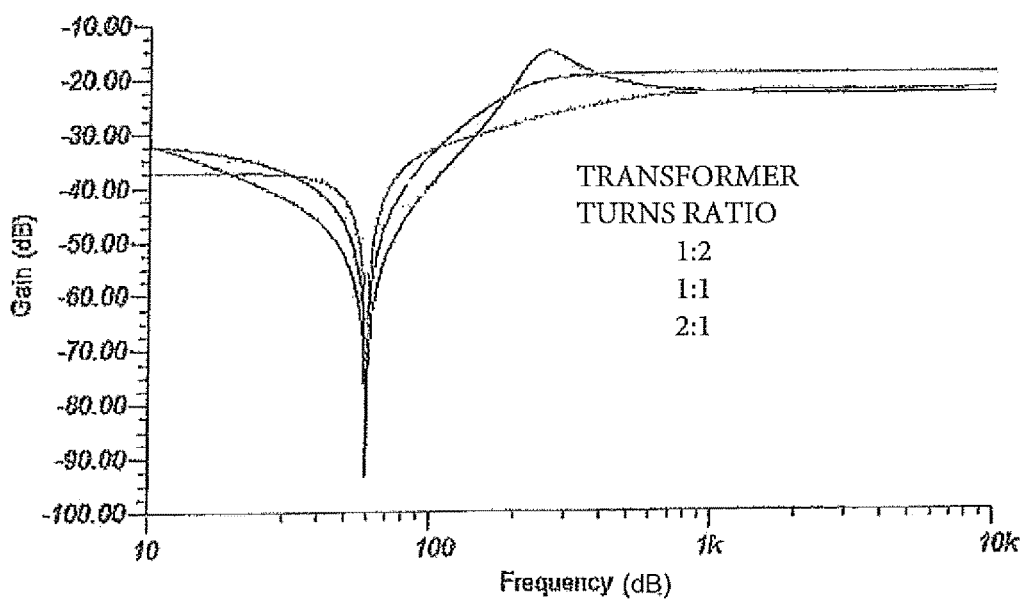

The turns ratio N2/N1 of transformer T1 also affects the performance of the present invention. The frequency response, using several values of turns ratio in the preferred embodiment configuration, is illustrated in the graph of FIG. 10. From the highest to the lowest values between 200 Hz and 300 Hz, the curves represent turns ratio of 1:2, 1:1, and 2:1, respectively.

The effect of the turns ratio upon the frequency response of the coupler 100 circuit is significant, not only with regard to the amplitude Q, and frequency of the peak in the frequency response; but, also with regard to the amplitude Q at the notch which occurs at the power line frequency. Thus, the turns ratio is a design aspect of the circuit of the invention with regard to frequency response.

Figure 11:
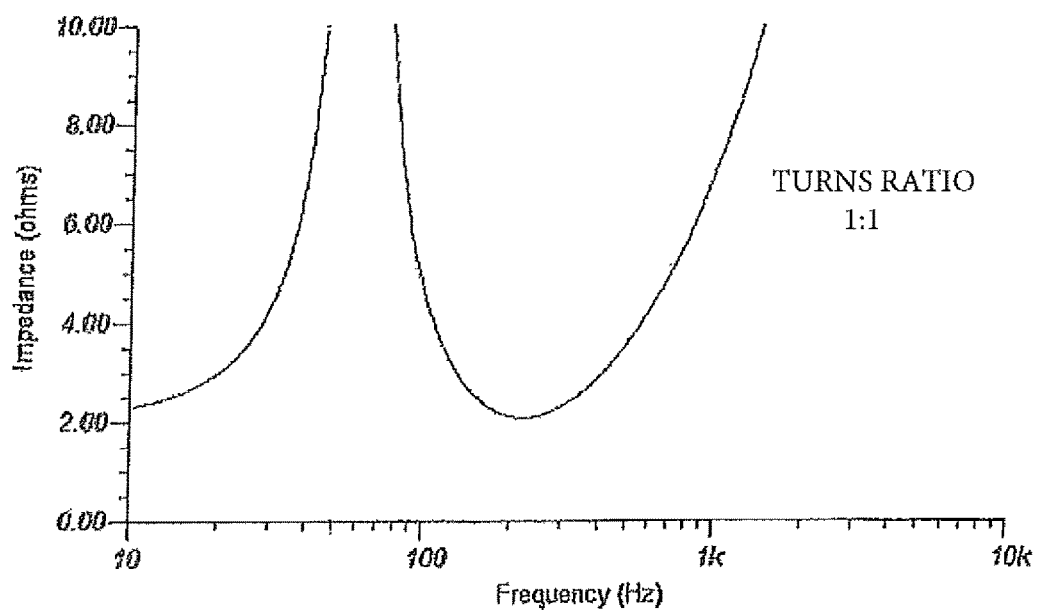
FIGS. 11-13 are graphs of amplifier load impedance for the circuit of the preferred embodiment for transformer turns ratios of 1:1, 2:1, and 1:2 respectively.
Figure 12:
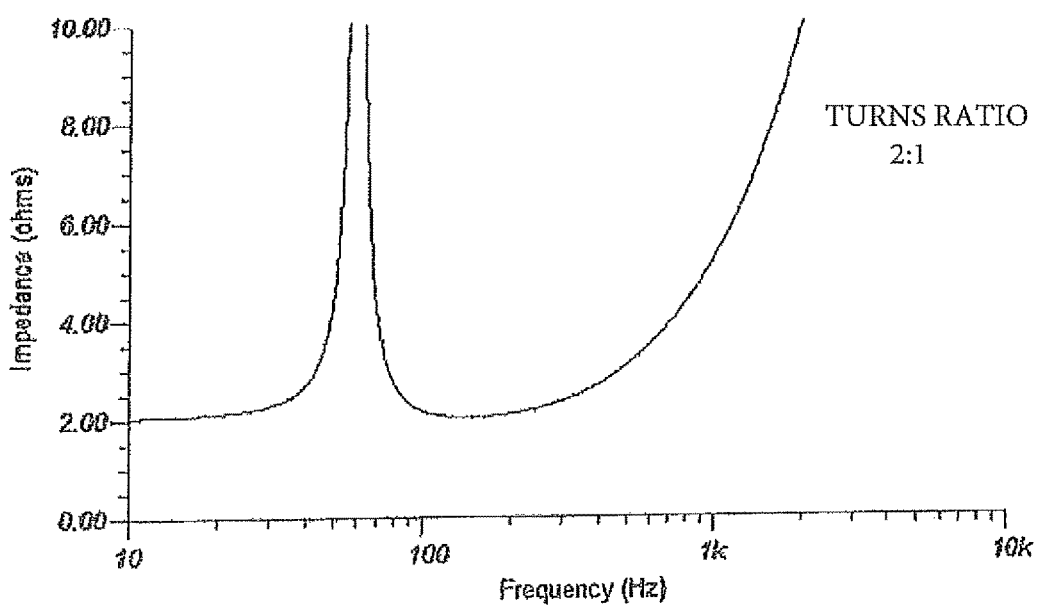
Figure 13:
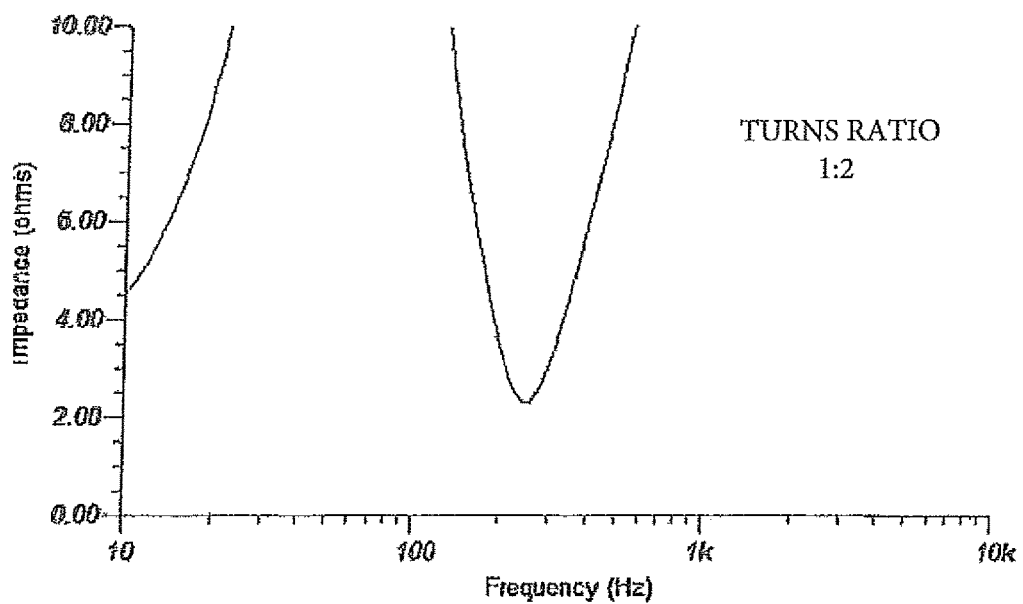

The amplifier load impedance for the preferred embodiment circuit for a turns ratio of 1:1 configuration is shown in FIG. 11. The amplifier load impedance for a turns ratio of 2:1 is shown in FIG. 12. And, the amplifier load impedance for a turns ratio of 1:2 is shown in FIG. 13:

The turns ratio has a negligible effect upon the minimum magnitude of amplifier load impedance because that value is almost entirely controlled by the value of resistor R1, and resistor R1 is on the amplifier 1 side of the transformer. Also, the turns ratio has a significant effect upon the range of frequencies at which the impedance magnitude is at, or near, its minimum value. Accordingly, turns ratio is a design consideration with respect to the frequency range at which the amplifier 1 load impedance magnitude is at, or near, a minimum value.

Similarly, because the impedance seen by the power line at, or near, the power line frequency is almost entirely controlled by the resonant circuit comprising capacitor C1 and inductor L3, which circuit is on the "power line" side of the transformer. The turns ratio of the transformer has a negligible effect upon the impedance seen by the power line at, or near, the power line frequency in the configuration of the preferred embodiment.

Referring again to FIG. 2, what is next considered is the effect upon frequency response resulting from the doubling the value of capacitor C1 while halving the respective values of inductor L3 and resistor R3. Accordingly, the values of the various circuit elements of the coupler 100 circuit are the same as previously set forth except that now:

C1=1000 μf
L3=7.05 mH
R3=33.5 mΩ.

In another alternate embodiment, the effect upon frequency response resulting from the halving of the value of capacitor C1, while respectively doubling the values of inductor L3 and resistor R3. Accordingly, the values of the various circuit elements of the coupler 100 circuit are again the same as previously set forth except that now:

C1=250 μf
L3=28.2 mH
R3=134 mΩ.

In FIGS. 14-20, there are shown the effects on coupler 100 circuit operations for the relative values of C1 and L3. From the highest to the lowest value at 100 Hz, the FIGS. represent values of 2C1 or C1=1000 μf and ½L3 or L3=7.05 mH; C1=500 μf and L3=14.1 mH; and, ½C1 or C1=250 μf, and 2L3 or L3=28.2 mH respectively. As shown in the FIGS., the relative values of C1 and L3 have a significant effect upon the frequency response of the circuit, so their selection is a design consideration with regard to frequency response. In addition, the relative values of C1 and L3 affect the impedance of the circuit in both directions; that is, from the standpoint of amplifier 1 looking "forward" toward the power line, and from the standpoint of the power line looking "backward" toward the amplifier.

Figure 14:
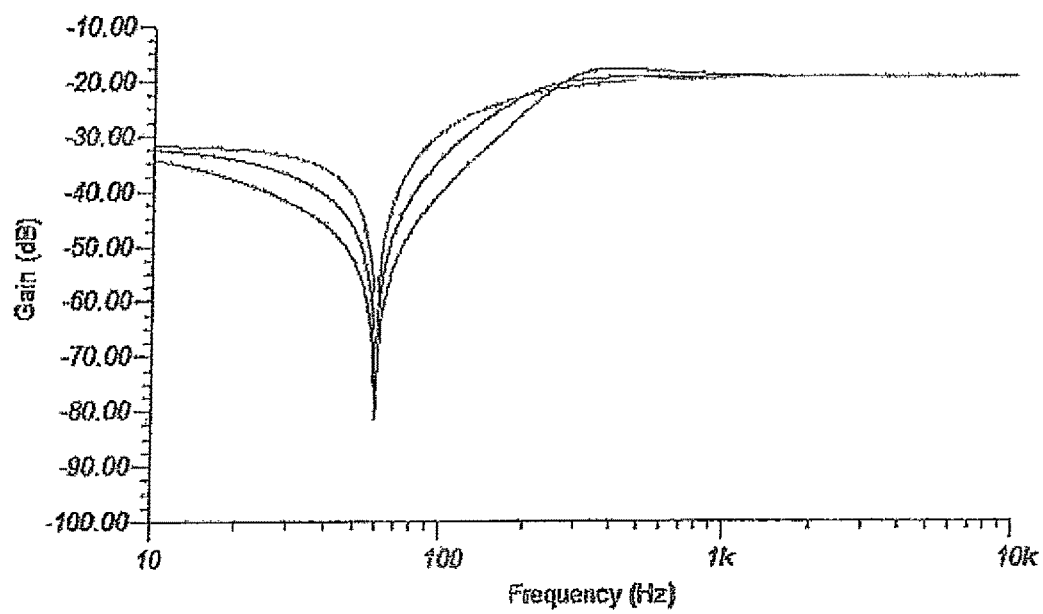
FIGS. 14-20 are graphs of gain vs. frequency for various combinations of capacitor and inductor impedances.
Figure 15:
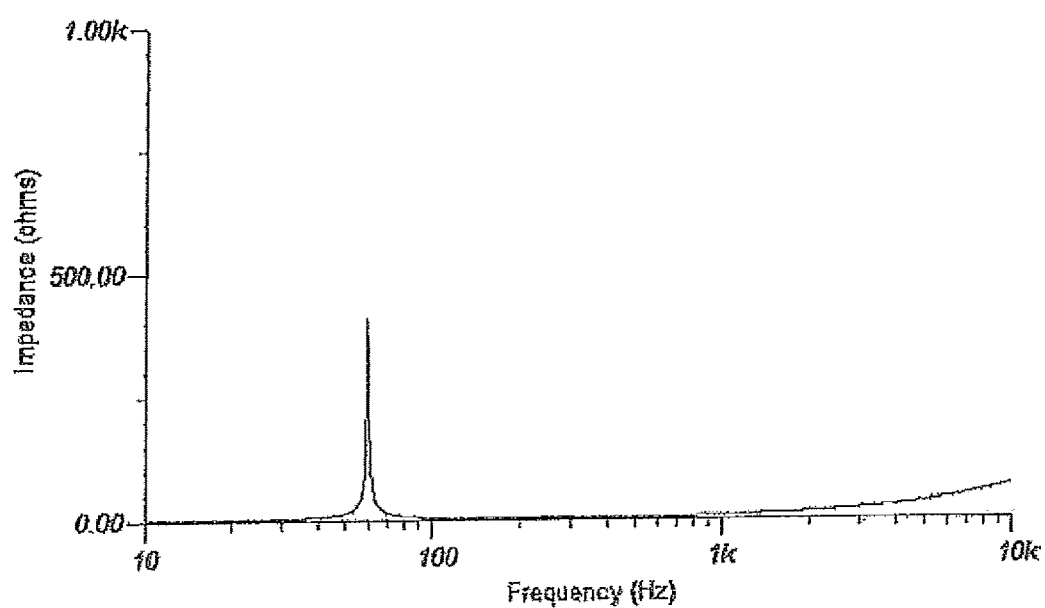
Figure 16:
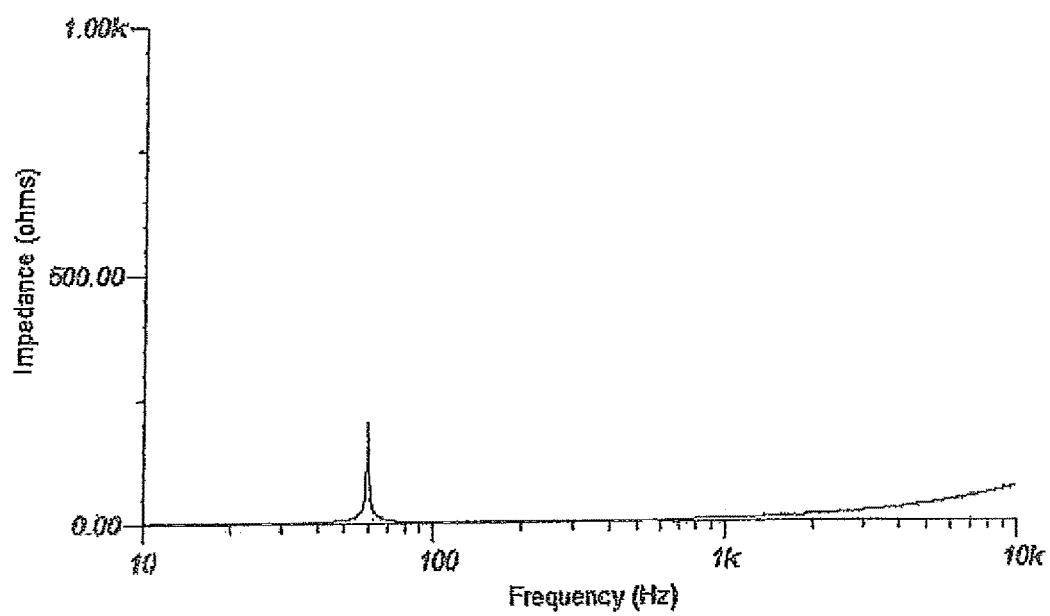
Figure 17:
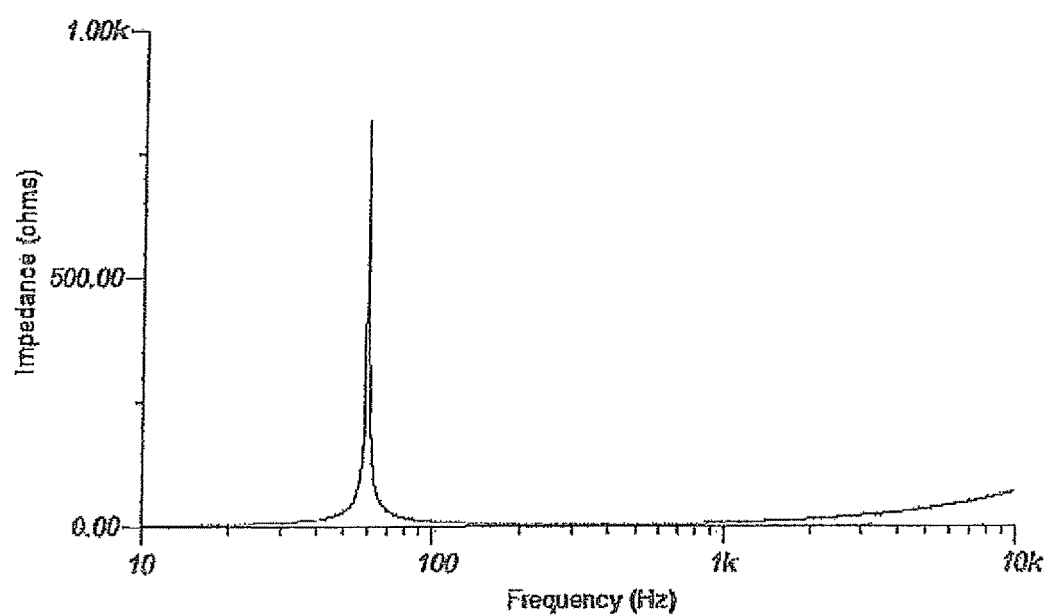
Figure 18:
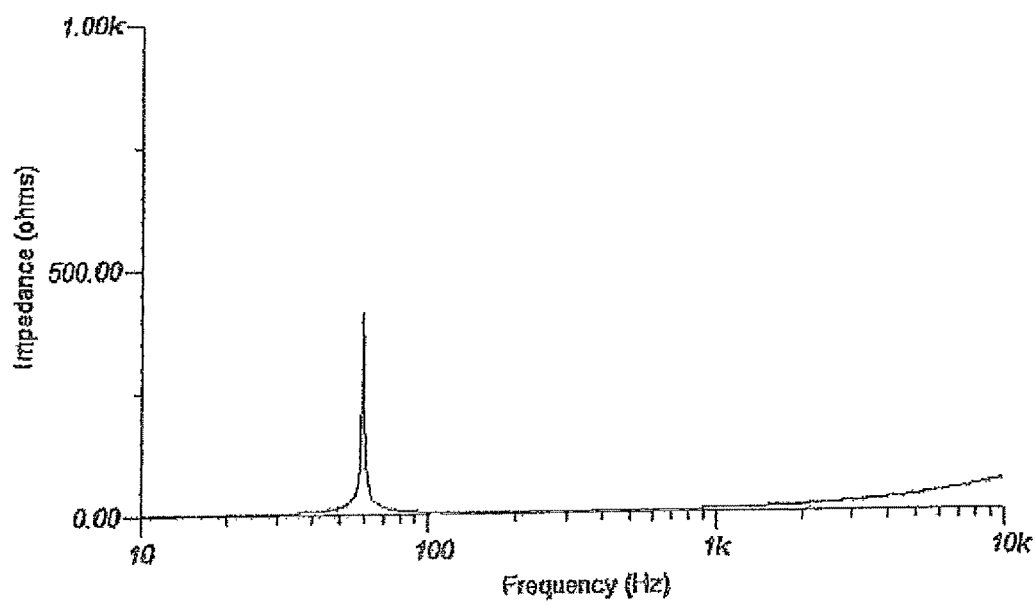
Figure 19:
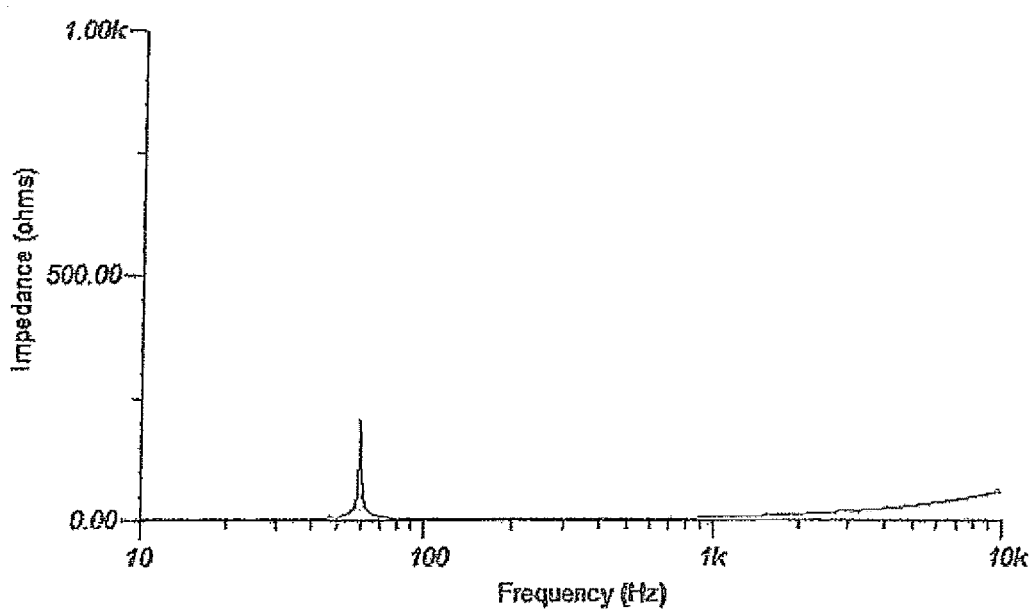
Figure 20:
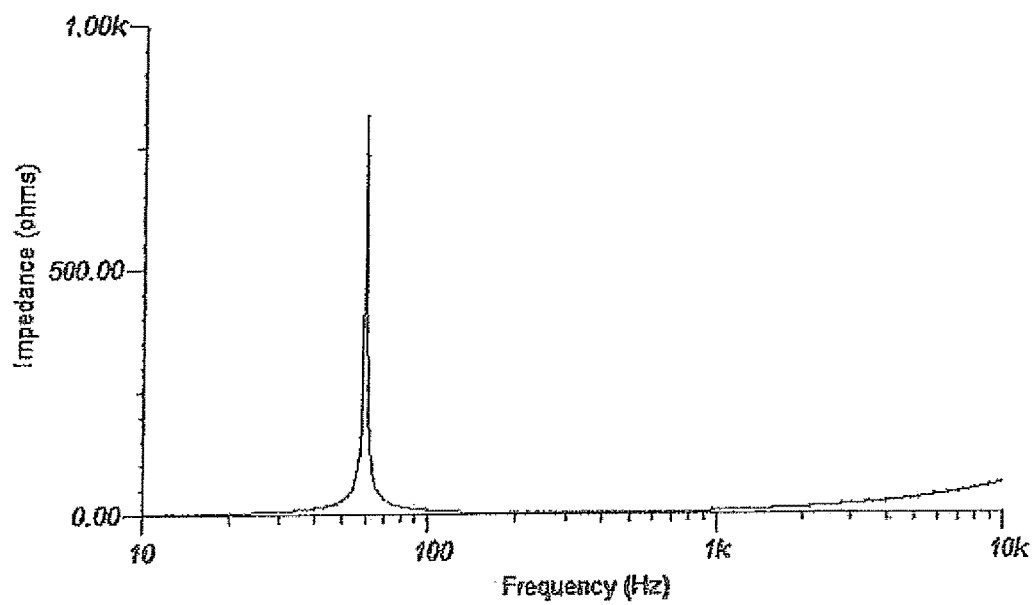

The magnitude of the impedance of the circuit, looking "forward", is shown in FIGS. 15-17, while the magnitude of the impedance of the circuit, looking "backward", is shown in FIGS. 18-20. FIG. 14 is a graph of the frequency response of the circuit for coupler 100 for relative values of C1 and L3. For FIGS. 15-17, the impedance graph of FIG. 15 is the values of C1 and L3 for the preferred embodiment circuit of FIG. 2; while FIG. 16 is for the values 2C1 and ½ L3; and FIG. 17 is for the values ½ C1 and 2L3. With respect to FIGS. 18-20, the impedance graph of FIG. 18 is for the noted values of C1 and L3 for the preferred embodiment circuit of FIG. 2; while FIG. 19 is for the values 2C1 and ½ L3; and FIG. 20 is for the values ½ C1 and 2L3.

Figure 21:
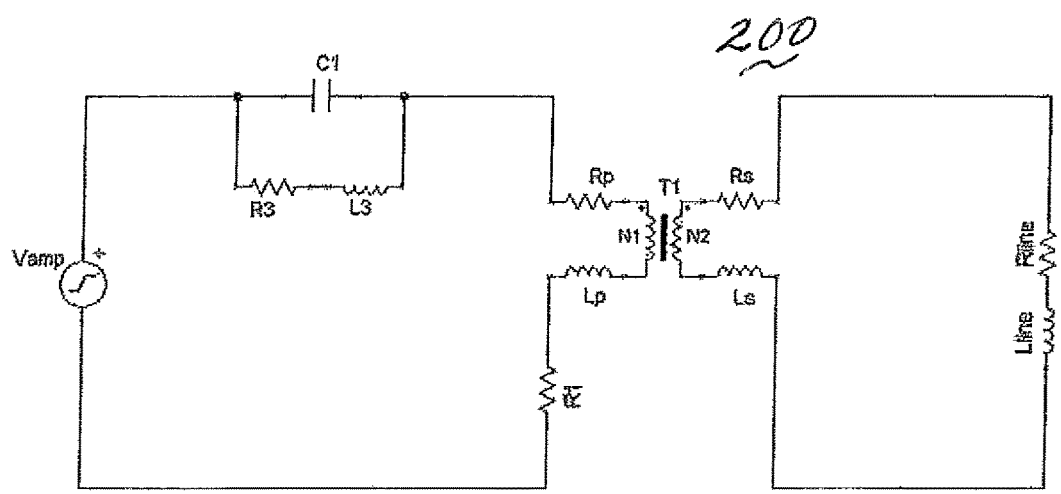
FIG. 21 is a schematic of an alternate embodiment of the coupler of the invention and FIG. 22 is a schematic of the circuit in differential form.

Referring to FIG. 21, in an alternate embodiment, a circuit 200 for the coupler has the resonant circuit comprising capacitor C1 and inductor L3 moved to the primary side of transformer T1. This circuit configuration is effective when the physical components used for the capacitor and/or inductor are not subjected to power line voltage.

The change to the circuit of FIG. 21 affects many circuit performance parameters, requiring the circuit to be re-analyzed for this new configuration. In particular, since the resonant circuit is now on the amplifier 1 side of transformer T1, the effect upon the impedance seen by the power line is strongly affected by the transformer turns ratio. Accordingly, the turns ratio of the transformer becomes a significant factor with regard to the impedance seen by the power line.

Figure 22:
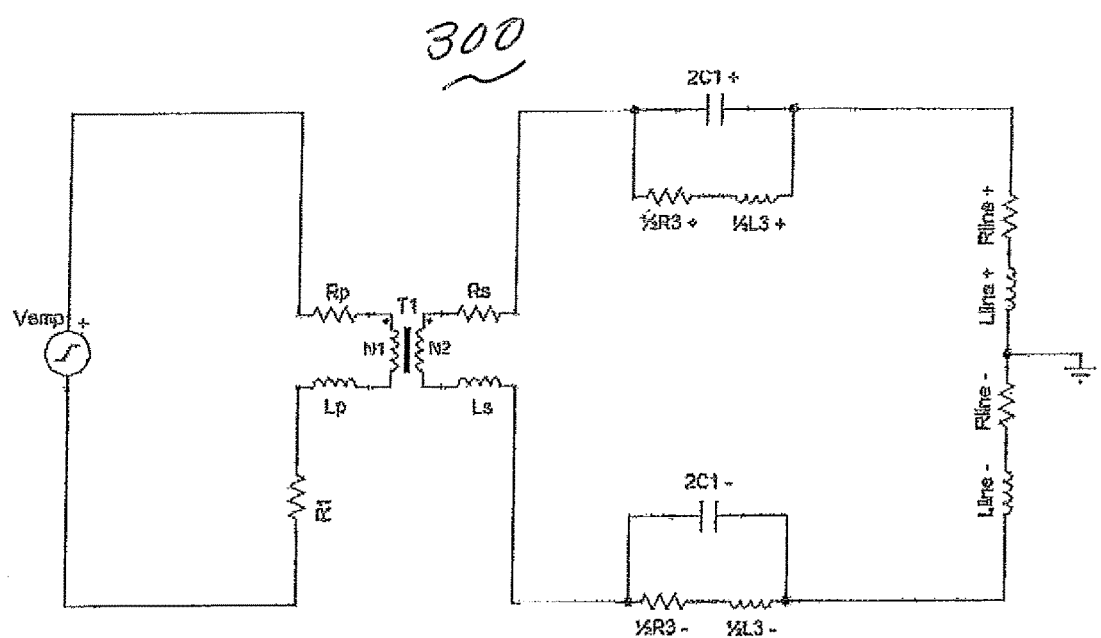

Finally, referring to FIG. 22, the coupler circuit can be implemented in differential form as indicated by circuit 300. Circuit 300 is effective in for use in split-phase situations. The circuit exhibits all of the same attributes as the circuit of the preferred embodiment, with the added benefit that each inductor value is reduced by half and the power line impedance is the sum of the impedances on each wiring phase. This slightly reduces the current necessary to induce a signal voltage in the power line.

In view of the above, it will be seen that the several objects and advantages of the present disclosure have been achieved and other advantageous results have been obtained.

Having thus described the invention, what is claimed and desired to be secured by Letters Patent is:

1. A circuit for coupling an amplifier to an electrical power distribution system for the amplifier to be both electrically and physically isolated from a power line of the system comprising:
    an amplifier generating arbitrary signal waveforms which are injected into the power line;
    a transformer having a primary side and a secondary side, the amplifier being located on the primary side of the transformer and the secondary side of the transformer being connected to the power line, the transformer electrically and physically isolating the amplifier from the power line;
    a resistor series connected with the primary side of the transformer together with the amplifier, the resistor sized to produce a minimum load impedance of the amplifier so to minimize power dissipation; and,
    a resonant circuit interposed between the secondary side of the transformer and the power line, the resonant circuit including a capacitor and an inductor whose respective values of capacitance and inductance are chosen so an amplitude of an arbitrary signal waveform peaks at a frequency of a power line waveform propagated through the power line.

2. The circuit of claim 1 in which a turns ratio of the transformer is selected to peak the amplitude of the arbitrary signal waveform at the frequency of the power line waveform.

3. The circuit of claim 1 in which the resonant circuit is on the primary side of the transformer together with said resistor.

4. The circuit of claim 3 further including a second resonant circuit installed on the secondary side of the transformer, the first said resonant circuit being interposed between a first terminal of a winding comprising the secondary side of the transformer connected to a first terminal for the power line, and the second resonant circuit being interposed between a second terminal of the winding connected to a second terminal for the power line.

5. The circuit of claim 1 in which the amplifier comprises one of:
    a voltage controlled voltage source amplifier;
    a voltage-controlled-current-source amplifier;
    a current-controlled-current-source amplifier, or,
    a current-controlled-voltage-source amplifiers.

6. In an electrical distribution system, a coupling circuit for use in an Ultra Low Frequency/Very Low Frequency (ULF/VLF) power line communications through the system, the coupling circuit including:
    an amplifier generating arbitrary signal waveforms which are injected into a power line of the distribution system, the amplifier being both electrically and physically isolated from the power line;
    a transformer having a primary and a secondary side with the amplifier being installed on the primary side of the transformer, and the secondary side of the transformer being connected to the power line for the transformer to electrically and physically isolate the amplifier from the power line;
    a resistor connected to the primary side of the transformer in series with the amplifier, the resistor sized to produce a minimum load impedance of the amplifier and minimize power dissipation; and,
    a resonant circuit interposed between the secondary side of the transformer and the power line, the resonant circuit including a capacitor and an inductor whose respective values of capacitance and inductance are chosen so an amplitude of an arbitrary signal waveform peaks at a frequency of a power line waveform propagated through the power line.

7. The circuit of claim 6 wherein a turns ratio of the transformer is as small as 1:1 yet still electrically and physically isolates the amplifier from the power line.

8. The circuit of claim 7 in which a turns ratio of the transformer is selected to peak the amplitude of the arbitrary signal waveform at the frequency of a waveform propagated through the power line.

9. The circuit of claim 6 in which the resonant circuit is installed on the primary side of the transformer with said resistor.

10. The circuit of claim 6 further including a second resonant circuit on the secondary side of the transformer, the first said resonant circuit being interposed between a first terminal of a winding comprising the secondary side of the transformer connected to a first terminal for the power line and the second resonant circuit being interposed between a second terminal of the winding connected to a second terminal for the power line.

11. In an electrical distribution system, a method for enabling an Ultra Low Frequency/Very Low Frequency (ULF/VLF) power line communications through the system, comprising
    providing a coupling circuit to couple arbitrary signal waveforms with a power line waveform propagated through the system;

injecting generated arbitrary signal waveforms a power line through an amplifier which is both electrically and physically isolated from the power line;

installing the amplifier on a primary side of a transformer whose secondary side is connected to the power line;

connecting a resistor to the primary side of the transformer in series with the amplifier, the resistor being sized to accommodate a minimum load impedance of the amplifier and minimize power dissipation; and, interposing a resonant circuit between the secondary side of the transformer and the power line, the resonant circuit including a capacitor and an inductor whose respective values of capacitance and inductance are chosen so an amplitude of an arbitrary signal waveform peaks at a frequency of the power line waveform propagated through the power line.

12. The method of claim 11 in which a turns ratio of the transformer is as small as 1:1 yet still electrically and physically isolates the amplifier from the power line.

13. The method of claim 11 further including selecting a turns ratio of the transformer so to peak the amplitude of the arbitrary signal waveform at the frequency of the power line waveform.

14. The method of claim 11 further including installing the resonant circuit on the primary side of the transformer with said resistor.

15. The method of claim 11 further including providing a second resonant circuit on the secondary side of the transformer, the first said resonant circuit being interposed between a first terminal of a winding comprising the secondary side of the transformer connected to a first terminal for the power line and the second resonant circuit being interposed between a second terminal of the winding connected to a second terminal for the power line.

* * * * *